May 17, 1938.  A. LYSHOLM  2,117,673
HYDRAULIC TRANSMISSION
Filed May 7, 1935  2 Sheets-Sheet 1
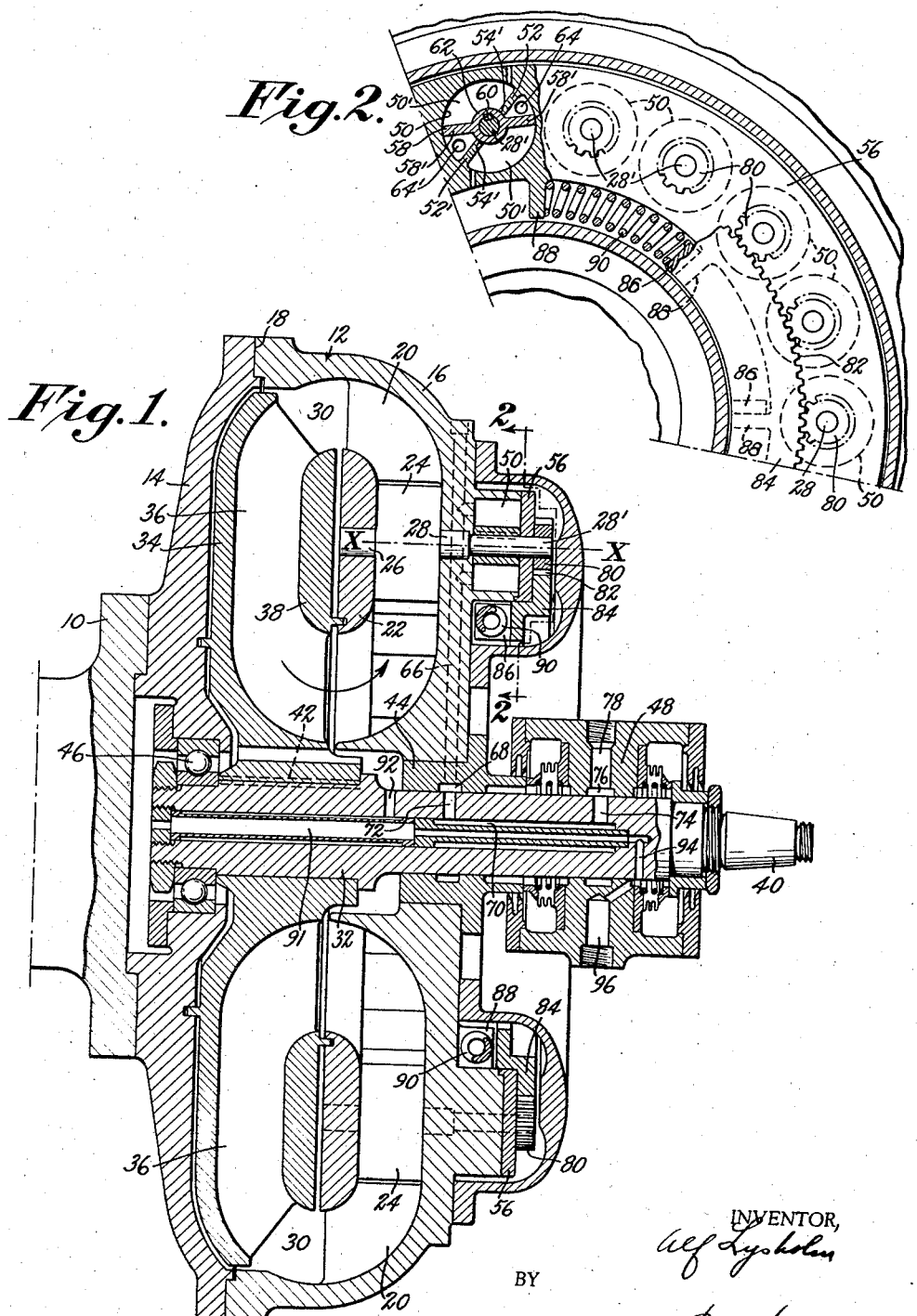

May 17, 1938.  A. LYSHOLM  2,117,673
HYDRAULIC TRANSMISSION
Filed May 7, 1935  2 Sheets-Sheet 2
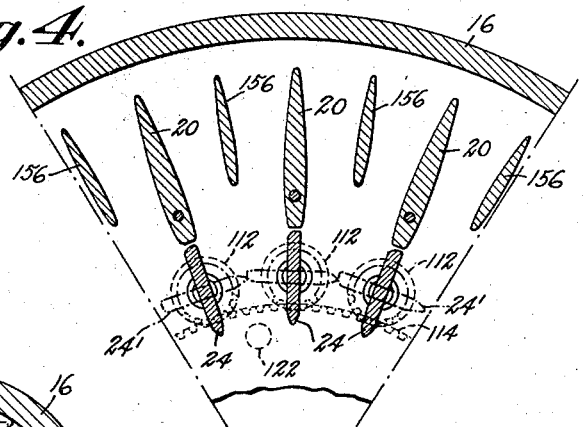
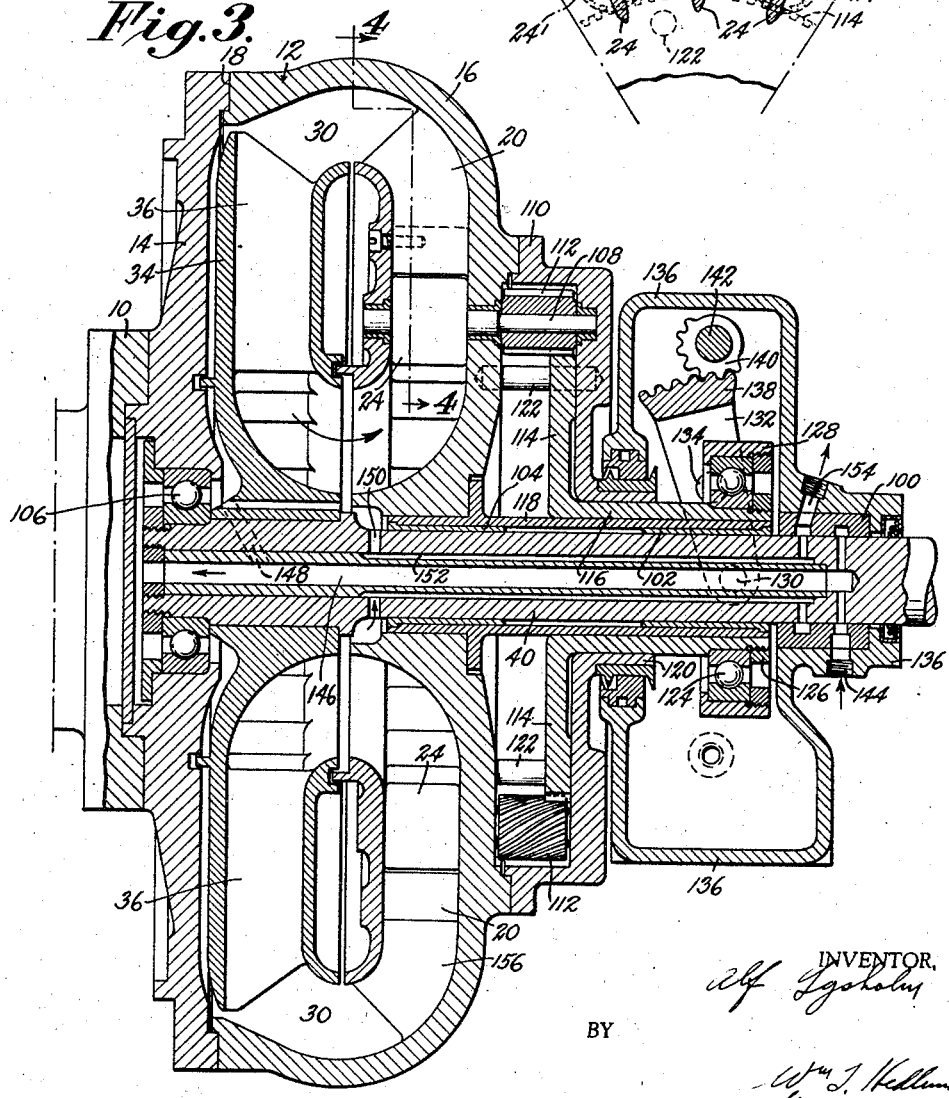
INVENTOR.
Alf Lysholm
BY
Wm J. Kellund
his ATTORNEY.

Patented May 17, 1938

2,117,673

UNITED STATES PATENT OFFICE 2,117,673

HYDRAULIC TRANSMISSION

Alf Lysholm, Stockholm, Sweden, assignor to Aktiebolaget Ljungströms Ångturbin, Stockholm, Sweden, a corporation of Sweden Application May 7, 1935, Serial No. 20,123
In Germany May 8, 1934

14 Claims. (Cl. 60—54)

The present invention relates to hydraulic transmissions and has particular reference to hydraulic variable speed transmissions of the kind in which the operating liquid is circulated in a closed path of flow through pump and turbine elements.

Different kinds of hydraulic transmissions of this general type may operate either as clutches or as torque converters for multiplying the torque derived from a power shaft.

In certain forms of transmission of this general type it is necessary to place the pump blades in a rotatably mounted casing forming a part of the driving end of the device, and if, when this is the case, the output of the pump is to be controlled, there arises the problem of providing a suitable practical control.

It is a general object of the present invention to provide improved means in a device of the above described character for controlling the output of the pump, and to this end separate adjustable control blades which are adjustable from the exterior of the casing are arranged within the casing in front of fixed blades, advantageously with the control blades arranged in front of or on the intake side of a series of fixed pump blades rotating with the casing. Since such control blades are located in and rotate with the rotatably mounted casing, a further problem is presented in effecting the adjustment of such control blades from the exterior of the casing, and a further object of the invention is to provide improved means whereby such adjustment may be simply and practically effected. The means for effecting such adjustment may be either mechanical or hydraulic, and in the accompanying drawings forming a part of this specification I have shown practical embodiments of both mechanical and hydraulic means for this purpose.

For a better understanding of the detailed nature of the invention and the advantages to be derived from its use, reference may best be had to the drawings and the ensuing description of the embodiments of apparatus shown therein.

In the drawings:

Fig. 1 is a more or less diagrammatic longitudinal central section of a transmission embodying the invention and comprising hydraulically operated adjusting means;

Fig. 2 is a view of a portion of the apparatus shown in Fig. 1, taken generally on the line 2—2 of Fig. 1 and with certain parts broken away for the sake of clearness;

Fig. 3 is a view similar to Fig. 1 showing a transmission embodying the invention and having a mechanical adjusting device for adjusting the position of the control blades; and Fig. 4 is a view taken generally on the line 4—4 of Fig. 3 and illustrating the arrangement of the pump blades and the adjustable control blades.

Turning now to the embodiment of the invention shown in Figs. 1 and 2, reference numeral 10 indicates a driving or power shaft adapted to be driven from any suitable source of power. Shaft 10 is fixed to the casing 12 of the transmission by any suitable means such as studs or the like (not shown). Casing 12, which constitutes the driving member of the transmission, is advantageously made of two casing parts 14 and 16 mating at the flange joint 18.

A series of fixed pump blades 20 arranged in the form of a ring are secured to the casing part 16, advantageously being cast integrally therewith, and serve to support a central ring-like member 22. On the inlet side of, or in other words, in front of the pump blades 20 there is located a ring-like series of adjustable control blades 24, which in the embodiment illustrated are journalled at 26 and 28 respectively in the ring member 22 and the wall of the casing part 16.

The casing 12 provides a working chamber 30 for the power transmitting fluid, and the driven member 32 of the transmission comprises a rotor part 34 carrying a series of turbine blades 36 which at their inner ends are connected by a ring-like member 38, and a shaft part 40 extending to the exterior of the casing. Parts 34 and 40 may advantageously be formed separately and keyed together as by means of a key 42.

The shaft part of the driven member is rotatably mounted with respect to the casing. In the embodiment shown, it is journalled with respect to the casing in a bearing member 44, and is further mounted in a ball bearing 46 at the inner end of the shaft. The portion of the shaft outside of the casing is further journalled in a stationary bearing member 48.

Formed integrally with or attached to the side of the casing member 16 is a series of operating cylinder chambers 50, the axes of the chambers being in alignment with the axes of rotation, indicated at x—x in Fig. 1, of the adjustable control blades. Each of the cylinder chambers 50 has projecting inwardly from diametrically opposite sides thereof stationary webs 52 and 52', the inner ends of which are cylindrically curved as indicated at 54 and 54'. The journal parts 28 of the adjustable blades are provided with extensions 28' extending through the chambers 50 and the ring-like cover member 56, which serves to close the chambers.

A series of control elements in the form of rotary members 58 are keyed as by means of keys 60 to the extensions 28' within the chambers 50. These members comprise hubs 62 seating against the curved inner ends of the webs 52 and 52', and together with the webs dividing each of the chambers into semi-cylindrical halves 50'. The members 58 are further provided with two vanes or wings 58' which operate in the semi-cylindrical portions of the chambers 50.

Ports 64 and 64' are provided for the admission to and withdrawal of pressure fluid from the cylinder parts 50', and these ports are in communication with a series of radial passages 66, one of which is shown in Fig. 1. Radial passages 66 communicate with an annular recess 68 in the bearing member 44, and this recess is in turn placed in communication with an axial bore 70 in the shaft 40 by means of one or more radial ports 72. A second series of radial ports 74 connects the bore 70 with an annular recess 76 in the external bearing member 48, and this latter recess is in turn in communication with a radial bore 78 adapted to be connected to any suitable source of pressure fluid.

A series of pinions 80 is keyed or otherwise secured to the projecting ends of the parts 28', and these pinions mesh with teeth 82 on an annular ring-like member 84 mounted to turn relative to the casing. At spaced intervals, the member 84 carries axially projecting webs 86 extending toward the casing, and the casing has formed therewith or secured thereto a series of spaced webs 88.

As will be observed from Figs. 1 and 2, the webs 86 and 88 are spaced radially the same distance from the axis of rotation of the shaft 40, and overlap in axial direction. Between each two adjacent webs 86 and 88 there is located a coil spring 90 tending to separate the members, and through the medium of the gear teeth on the member 84 and the pinions 80 to maintain the vanes 58' of the rotary members in the position shown in Fig. 2. This position may be termed an initial position, and is definitely established by the contact of webs 86 against webs 88 as shown in Fig. 2 which contact limits the movement in one direction of the part 84 relative to the casing structure. In this initial position the ports 64 and 64' are uncovered.

For maintaining the working chamber 30 filled with operating liquid, and for the withdrawal of air and gases from this chamber, the shaft 40 is advantageously provided with an inner bore 91 communicating by way of radial ports 92 with chamber 30, and further communicating by means of radial port or ports 94 with a suitable opening 96 in the stationary bearing member 48.

The operation of the above described apparatus will be largely apparent from the foregoing description.

In the initial position of the control elements corresponding to the position of the ring member 84 shown in Fig. 2, the vanes of the rotary members are not subjected to fluid pressure, and the parts are held in the relative positions shown by the springs 90. If pressure of fluid in the chambers 50' is increased, the vanes of the rotary members are turned clockwise as viewed in Fig. 2 due to the fluid pressure, and the adjustable control blades are turned by an amount corresponding to the amount of fluid pressure applied. Such movement is resisted by the springs 90, which are compressed due to the turning movement of the rotary members. Upon decrease of the fluid pressure in the control chambers the springs 90 turn the rotary members toward their initial position, the amount of turning movement being determined by the degree to which the fluid pressure is decreased.

Since all of the rotary members are connected to the common actuating member 84, all of the adjustable blades will assume the same position of rotation about their individual axes. Advantageously, the position of the adjustable blades relative to the position of the vanes 58' is such that when the latter are in their initial positions the adjustable blades are wide open to provide for maximum flow of the working fluid in chamber 30 to the inlet side of the pump blades 20.

In the embodiment illustrated in Figs. 3 and 4, the principal parts of the transmission are essentially the same as in the construction shown in Fig. 1, and such parts are designated by corresponding reference characters. In the present embodiment, however, the shaft part 40 of the driven member is journalled in an outer stationary bearing 100, intermediate bearings 102 and 104, and an inner ball bearing 106. The adjustable control blades 24 are provided with extending pins 108 journalled in the casing part 16 and in a member 110 secured to the side of the casing. Pins 108 have secured to them pinions 112 having spiral teeth which engage the spiral teeth of a control member 114 having a cylindrical sleeve portion 116 slidably mounted between a bushing 118 and a bearing 120 formed as a part of the member 110. The control member 114 is fixed against rotational movement relative to the casing 12 by means of one or more axially disposed pins 122 held in suitable sockets in the casing member 16 and the member 110 and passing through suitable holes in the control member 114.

The inner race of a ball bearing 124 is fixed to the outer end of the sleeve 116 by means of a lock nut 126, and the outer race of this bearing carries a ring-like member 128 having diametrically opposed yoke pins 130 extending outwardly therefrom. A yoke member 132 is pivoted at 134 to a stationary housing part 136 carrying the bearing 100 and is provided with a rack 138 engaging a segmental pinion 140 mounted on an actuating cross-shaft 142 journalled in the housing 136.

The arrangement shown in this embodiment operates as follows:

The adjustment of the position of the adjustable control blades is effected by turning the segmental gear in counter-clockwise direction as shown in Fig. 3. This moves rack 138 from left to right as seen in the figure, and causes the control member 114 to be shifted from right to left. The axial shifting movement of this member, which is prevented from turning relative to the casing by means of the pin or pins 122, acts to turn the spiral toothed pinions 112 about their axes and to correspondingly rotate the adjustable blades to the position desired, depending upon the extent to which the control member 114 is shifted. Since there is a direct positive mechanical connection between the blades and the external control shaft 142, no retracting or return springs are necessary.

As shown in the figure, the adjusting apparatus is in one of its two extreme positions which may be considered an initial position, and which may advantageously be with the blades fully open.

In the present embodiment, the main working chamber 30 is intended to be maintained full of operating fluid at all times which is advantageously maintained in constant circulation in the direction indicated by the arrows in the drawings, whenever the transmission is in operation. To this end, operating fluid is admitted through the inlet 144 in member 136, which inlet communicates by means of suitable radial bores in shaft 40 and an annular recess in the bearing 100 with an axial bore 146 in shaft 40. Bore 146 is in communication by way of ports 148 and also through the bearing 106 with the interior of the working chamber 30, and the operating fluid is withdrawn from chamber 30 through the radial shaft ports 150 and the annular bore 152 to an outlet 154 in member 136, this outlet being in communication with the annular bore 152 by means of suitable radial bores in the shaft and an annular recess in the bearing member 100. It will be understood, of course, that while fluid is preferably constantly admitted to the working chamber and withdrawn therefrom during operation of the device for purposes of cooling, the working or power transmitting flow of the fluid in the chamber is in a closed path as indicated by the arrow in the figure, that is, radially outwardly between the adjustable blades and the pump blades and radially inwardly between the turbine blades.

In the present embodiment, as well as in the embodiment shown in Fig. 1, the adjustable control blades may advantageously be of the form shown in Fig. 4, and it will be observed that in both of the embodiments shown, the adjusting mechanism permits the blades to be moved through an angle of at least 90° so that they can be moved from their initial position indicated in full lines in Fig. 4 to a position at right angles thereto and indicated in dotted lines at 24', in which latter position the flow of working fluid to the inlet of the fixed pump blades is entirely cut off.

In some instances, where the circumferential distance between adjacent main pump blades 20 is considerable, owing to the size of the apparatus, it may be desirable to provide additional auxiliary blades 156, as shown in Fig. 4, the principal function of these blades being to insure a smooth and regular flow of operating fluid from the discharge side of the pump. For the purpose of the present application blades 156 will be considered as guide blades rather than as pump blades.

While it is preferable to place the adjustable blades on the inlet side of the fixed pump blades other locations may be employed.

It will be evident that many changes and variations in the specific structure hereinbefore described may be made without departing from the spirit or scope of the invention, which is to be understood as defined by the scope of the appended claims.

What is claimed is:

1. In a hydraulic transmission, a driving member comprising a rotatably mounted casing providing a working chamber in which liquid is circulated in a closed path of flow to transmit power, a ring of fixed liquid impelling blades mounted in said casing and rotating therewith, a ring of control blades mounted in said casing and rotating therewith, the spaces between adjacent fixed blades and between adjacent control blades constituting serially related portions of said path of flow, and said control blades being pivotally mounted in said casing and adjustable about their respective pivots to alter the cross-sectional area for flow of liquid through the ring of control blades, whereby to control the rate of circulation of the liquid in the transmission, and means operable from the exterior of the casing for altering the positions of said control blades.

2. In a hydraulic transmission, a driving member comprising a rotatably mounted casing providing a working chamber in which liquid is circulated in a closed path of flow to transmit power, a ring of fixed liquid impelling blades mounted in said casing and rotating therewith, a ring of adjustable control blades mounted in said casing and rotating therewith, the spaces between adjacent fixed blades and between adjacent control blades constituting serially related portions of said path of flow and said adjustable control blades being adjustable relative to each other to alter the area of said path of flow through said ring of adjustable control blades, and means operable from the exterior of the casing for altering the positions of said control blades relative to each other.

3. In a hydraulic transmission, a driving member comprising a rotatably mounted casing providing a working chamber in which liquid is circulated in a closed path of flow to transmit power, a ring of fixed liquid impelling blades mounted in said casing and rotating therewith, a ring of adjustable control blades mounted in said casing and rotating therewith, said ring of adjustable control blades being disposed on the entrance side of said ring of fixed blades and said control blades being adjustable to alter the area of said path of flow through the ring of control blades, and means operable from the exterior of the casing for altering the positions of said control blades.

4. In a hydraulic transmission, a driving member comprising a rotatably mounted casing providing a working chamber in which liquid is circulated in a closed path of flow to transmit power, a ring of fixed liquid impelling blades mounted in said casing and rotating therewith, a ring of adjustable control blades mounted in said casing and rotating therewith, a driven member comprising a rotor part located in said chamber and a shaft part rotatably mounted with respect to said casing and extending through a wall of the casing, said rotor part comprising turbine blades adapted to receive liquid discharged from said fixed blades, said ring of adjustable control blades being disposed at the inlet side of said ring of fixed blades and being adjustable to alter the area of said path of flow through the ring of control blades, and means operable from the exterior of the casing for altering the position of said control blades.

5. In a hydraulic transmission, a driving member comprising a rotatably mounted casing providing a working chamber for circulation of liquid in a closed path of flow to transmit power, a ring of fixed pump blades mounted in said casing and rotating therewith, a driven member comprising a rotor part located in said chamber and a shaft part rotatably mounted with respect to said casing and extending through a wall of the casing, said rotor part comprising turbine blades adapted to receive liquid discharged from said pump blades, a ring of adjustable control blades mounted in the casing in front of said fixed pump blades for controlling flow of liquid to the pump blades, said control blades being adjustable to alter the area of said path of flow through the ring of control blades, and hydraulic means for altering the position of said control blades including channels for actuating fluid in said casing and in the shaft part of said driven member.

6. In a hydraulic transmission, a driving member comprising a rotatably mounted casing providing a working chamber and having a series of fixed pump blades mounted in said casing, a series of adjustable control blades mounted in the casing in front of said pump blades, said adjustable control blades being adjustable to alter the area of the path of flow therebetween, means providing a series of control chambers rotatable with said casing, blade adjusting elements located in said chambers and connected to said adjustable blades, and means including channels in said casing in communication with a source of pressure fluid outside of the casing for admission of pressure fluid to said chambers to actuate said adjusting elements.

7. In a hydraulic transmission, a driving member comprising a rotatably mounted casing providing a working chamber and having a ring of fixed pump blades mounted in said casing, a ring of adjustable control blades pivotally mounted in the casing inwardly of said pump blades for directing movement about axes parallel to the axis of rotation of said casing, means providing a ring of control chambers formed on and rotatable with said casing, each of said control chambers being in axial alignment with the axis of rotation of a control blade, a rotary member attached to each control blade and having pressure responsive vanes located in one of said control chambers, means including channels in said casing in communication with a source of pressure fluid outside of the casing for admitting pressure fluid to said chambers to actuate said vanes, and a spring-loaded member operatively connected to each of said valve members for resisting movement thereof due to fluid pressure in said control chambers and for returning said valve members to their initial position upon release of fluid pressure from said control chambers.

8. In a hydraulic transmission, a driving member comprising a rotatably mounted casing providing a working chamber for operating fluid and having a series of fixed pump blades mounted in said casing, a series of adjustable control blades pivotally mounted in said casing in front of said pump blades, means providing a plurality of control chambers rotatable with said casing, pivotally mounted adjusting elements located in said control chambers and connected to said control blades, said adjusting elements being adapted to turn said adjustable blades from an initial position upon admission of pressure fluid to the chambers, means including a plurality of channels in communication with a source of pressure fluid outside of the casing for admitting pressure fluid to said chambers to actuate said adjustable elements, and a common return member operatively connected to said adjusting elements, said return member being movably mounted with respect to said casing, and means acting on said return member to cause it to return said adjusting elements to initial position upon release of fluid pressure in said control chambers.

9. In a hydraulic transmission, a driving member comprising a rotatably mounted casing providing a working chamber for operating fluid, a ring of adjustable control blades pivotally mounted in said casing for controlling flow of operating fluid in said chamber, means providing a plurality of control chambers formed on and rotatable with said casing, pivotally mounted adjusting elements located in said control chambers and connected to said control blades, said adjusting elements being adapted to turn said adjustable blades from an initial position upon admission of pressure fluid to the control chambers, means including a plurality of channels in communication with a source of pressure fluid outside of the casing for admitting pressure fluid to said chambers to actuate said adjustable elements, a series of gear elements each connected to a different one of said adjusting elements, a ring member rotatably mounted with respect to said casing and having teeth engaging each of said gear members, and a series of springs between said ring member and said casing for urging said ring member to a position of rotation relative to said casing in which said adjustable blades are in said initial position.

10. In a hydraulic transmission, a driving member comprising a rotatably mounted casing providing a working chamber for operating fluid, fixed pump blades mounted in said casing, adjustable control blades mounted in said casing in front of the pump blades, fluid pressure actuated means for moving said adjustable blades from an initial position permitting maximum area for flow of operating fluid between the control blades to positions providing reduced area for flow of operating fluid therebetween, and spring actuated means mounted on said casing and movable relative thereto for returning said adjustable blades to said initial position.

11. In a hydraulic transmission, a driving member comprising a rotatably mounted casing providing a working chamber for operating fluid, a ring of pump blades fixed in said casing and rotating therewith, a ring of adjustable control blades pivotally mounted in said casing inwardly of said pump blades, each of said control blades being situated radially inwardly of a pump blade and forming a radial continuation thereof when in radial position and said control blades being circumferentially spaced so as to form a substantially closed ring when turned to positions substantially at right angles to their radial positions, and means operable from the exterior of the casing for moving said control blades through at least 90° from their radial position.

12. In a hydraulic transmission, a driving member comprising a rotatably mounted casing providing a working chamber for operating fluid, a series of fixed pump blades mounted in said chamber and rotating with said casing, a series of adjustable control blades movably mounted in said casing and adjustable to vary the area for flow of operating fluid to said pump blades, and mechanical means operable from the exterior of the casing for moving said control blades.

13. In a hydraulic transmission, a driving member comprising a rotatably mounted casing providing a working chamber, a series of fixed pump blades mounted in said chamber and rotating with said casing, a series of adjustable control blades movably mounted in said casing and adjustable to vary the area for flow of operating fluid to said pump blades, and means operable from the exterior of the casing for altering the position of said control blades, said means comprising a series of control elements each connected to one of said control blades, a member axially movable and rotationally fixed with respect to said casing, said elements being operatively connected with said control elements to turn them upon axial movement of said member relative to said casing, and rotationally stationary means outside of the casing for shifting said member axially with respect to the casing.

14. In a hydraulic transmission, a driving member comprising a rotatably mounted casing providing a working chamber for operating fluid, a ring of fixed pump blades mounted in said casing, a ring of control blades mounted in said casing inwardly of said pump blades, said control blades being pivotally mounted to rotate about axes parallel to the axis of rotation of the casing and being fixed to pivot pins extending through the wall of the casing to the exterior of said working chamber, gears fixed to the extending ends of said pivot pins, said gears having spiral teeth, a control member axially movable and rotationally fixed with respect to said casing, said member having a disc-like portion carrying gear teeth meshing with the teeth on each of said gears, and means including a connection having parts axially fixed and rotationally movable relative to each other for shifting said control member axially with respect to the casing, whereby to turn said gears about their respective axes.

ALF LYSHOLM.